(12) United States Patent
Ayachitula et al.

(10) Patent No.: US 7,623,675 B2
(45) Date of Patent: Nov. 24, 2009

(54) VIDEO DATA MANAGEMENT USING ENCAPSULATION ASSETS

(75) Inventors: Naga A. Ayachitula, Elmsford, NY (US); Shu-Ping Chang, Shrub Oak, NY (US); Arun Hampapur, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 11/230,095

(22) Filed: Sep. 19, 2005

(65) Prior Publication Data
US 2007/0064974 A1  Mar. 22, 2007

(51) Int. Cl.
*G06K 9/00* (2006.01)
(52) U.S. Cl. ..................................... 382/103
(58) Field of Classification Search ......... 382/103–107; 348/169–180; 340/907–917, 530–541
See application file for complete search history.

(56) References Cited

U.S. PATENT DOCUMENTS

| | | | |
|---|---|---|---|
| 6,393,163 B1 | 5/2002 | Burt et al. | |
| 6,650,633 B1 | 11/2003 | Albers et al. | |
| 2003/0025599 A1* | 2/2003 | Monroe | 340/531 |
| 2003/0072492 A1 | 4/2003 | Sugimura et al. | |
| 2003/0161539 A1 | 8/2003 | Montgomery | |
| 2003/0190154 A1 | 10/2003 | Lim et al. | |
| 2003/0202578 A1 | 10/2003 | Shibata et al. | |

OTHER PUBLICATIONS

Cheyer, A. et al., "MVIEWS: Multimodal Tools for the Video Analyst," Proceedings of the 1998 International Conference on Intelligent User Interfaces, Jan. 6-9, 1998, pp. 55-62.

* cited by examiner

*Primary Examiner*—Samir A Ahmed
*Assistant Examiner*—Atiba O Fitzpatrick
(74) *Attorney, Agent, or Firm*—Hoffman Warnick LLC

(57) ABSTRACT

An improved solution for managing video data is provided. In particular, for each instance of a tracking object in video, an encapsulation asset is generated. The encapsulation asset includes a set of tracking object metadata, a set of background images from the video, a set of object images for the tracking object, and a set of reconstruction data that can be used to approximate the video using the sets of background images and object images. The encapsulation assets and/or video can be stored in a computer architecture, such as an enterprise information system, and searches can be performed on the encapsulation assets.

18 Claims, 11 Drawing Sheets

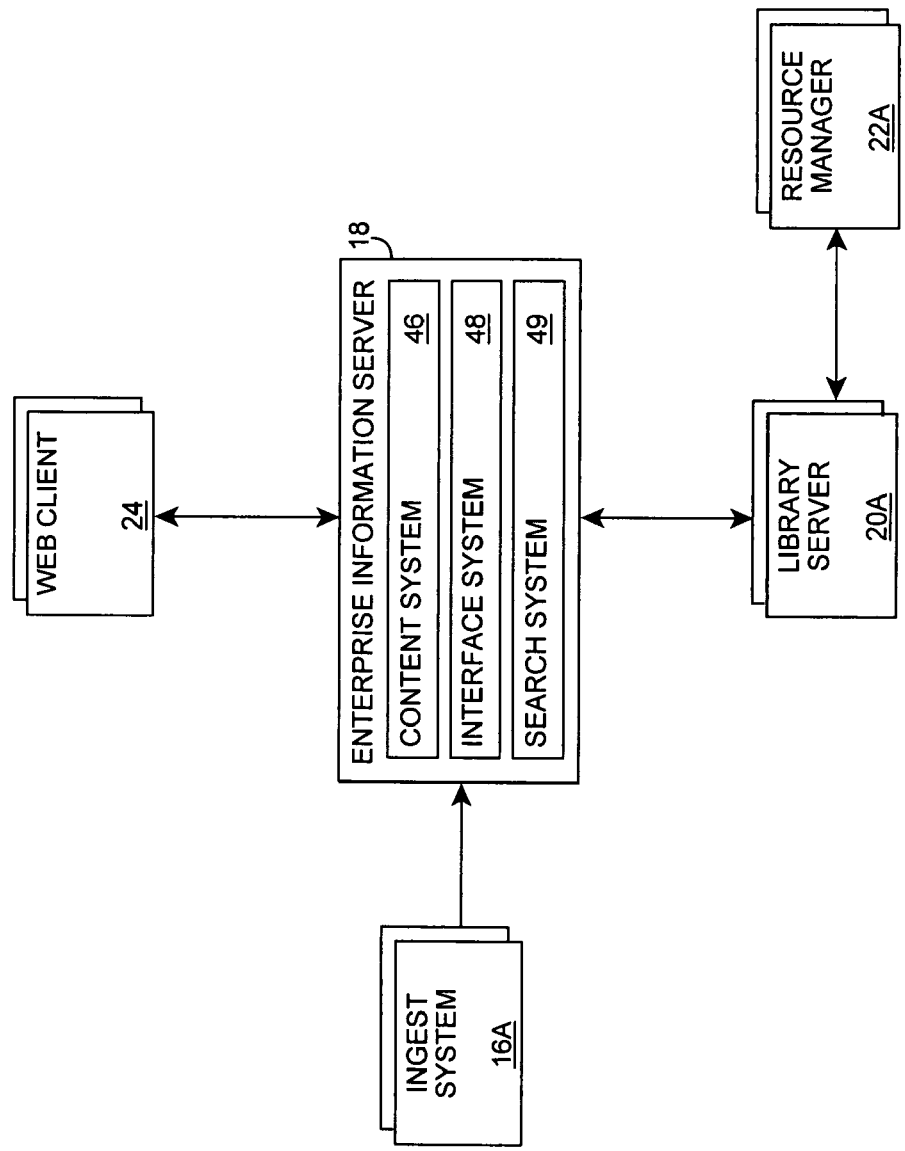

FIG. 7

SIVA - Surveillance Index Visualization Application

Home : Item Type List : Search SSE Track Information

Logoff

Search
Reset

⦿ Basic
○ Advanced
☐ Open in new window

CAMERAID : 1
TRACKID : 5372
OBJECTTYPE : Car
TA_START_DATE : (YYYY-MM-DD-HH.MM.SS.IIIII)
TA_END_DATE : (YYYY-MM-DD-HH.MM.SS.IIIII)
TV_START_DATE : (YYYY-MM-DD-HH.MM.SS.IIIII)
TV_END_DATE : (YYYY-MM-DD-HH.MM.SS.IIIII)
CLASSID :
TA_MINIMUM :
TA_MAXIMUM :
TA_AVERAGE :
TA_VARIANCE :
TV_MINIMUM :
TV_MAXIMUM :
TV_AVERAGE :
TV_VARIANCE :
INFO :
Document Contents :
⦿ ALL of these words  ○ ANY of these words

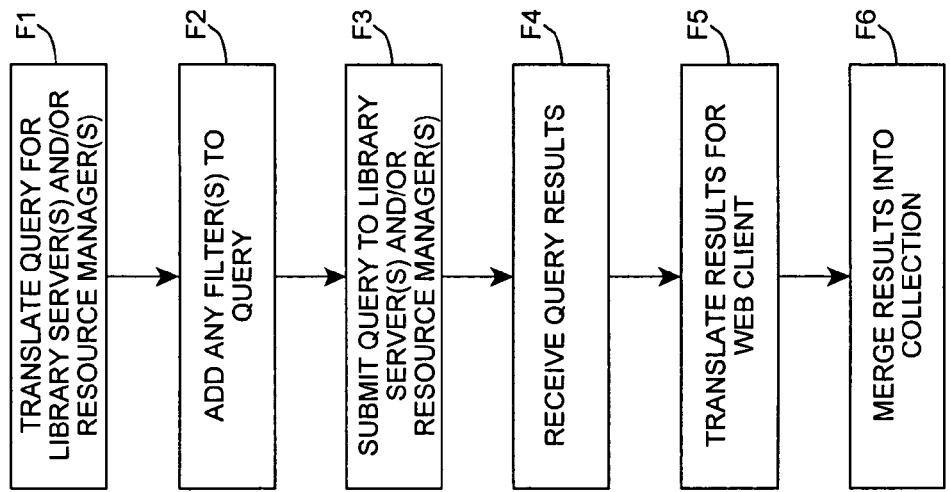

VIDEO DATA MANAGEMENT USING ENCAPSULATION ASSETS

BACKGROUND OF THE INVENTION

1. Technical Field

The invention relates generally to video, and more particularly, to a solution for managing video data, such as that obtained from surveillance video.

2. Background Art

In the security industry, video surveillance is an important tool for obtaining information. For example, surveillance video can provide valuable information on the commission of a crime to investigators. Increasingly, the security industry is focused on the prevention of crime. However, many video surveillance systems do not provide a useful preventive tool due to the large amount of video (or camera) data and limits on human capabilities.

In light of this, "smart" surveillance solutions are being proposed. These solutions incorporate automatic video analysis to provide real time alarms for suspicious behavior and situational awareness through an awareness of the location, identity and activity of objects in the monitored area. However, these solutions generate a large amount of video data as well as information about the video data, creating a data/information overflow problem. The organization and storage of this data affects the ability to search and/or retrieve information, and as a result, the value of the solution.

Current solutions store the information in a large number of files on a computer file system. As the number of files grows, an ability to efficiently search and/or retrieve the information is reduced. As a result, a need exists for an improved solution for managing video data.

SUMMARY OF THE INVENTION

The invention provides an improved solution for managing video data. In particular, for each instance of a tracking object in video, an encapsulation asset is generated. The encapsulation asset includes a set of tracking object metadata, a set of background images from the video, a set of object images for the tracking object, and a set of reconstruction data that can be used to approximate the video using the sets of background images and object images. The encapsulation assets and/or video can be stored in a computer architecture, such as an enterprise information system, and searches can be performed on the encapsulation assets.

A first aspect of the invention provides a method of managing video data, the method comprising: obtaining a tracking object in the video; generating an encapsulation asset for the tracking object based on the video, wherein the generating step includes: obtaining a set of tracking object metadata; extracting a set of background images from the video; extracting a set of object images for the tracking object; and generating a set of reconstruction data for approximating the video using the set of background images and the set of object images.

A second aspect of the invention provides a system for managing video data, the system comprising: a system for obtaining a tracking object in the video; a system for managing an encapsulation asset for the tracking object based on the video, wherein the encapsulation asset includes: a set of tracking object metadata; a set of background images from the video; a set of object images for the tracking object; and a set of reconstruction data for approximating the video using the set of background images and the set of object images.

A third aspect of the invention provides a system for managing video data, the system comprising: a system for managing a set of encapsulation assets, wherein each encapsulation asset includes data for a unique instance of a tracking object in video, wherein the encapsulation asset includes: a set of tracking object metadata; a set of background images from the video; a set of object images for the tracking object; and a set of reconstruction data for approximating the video using the set of background images and the set of object images; a system for receiving search criteria for the tracking object metadata; a system for searching the set of encapsulation assets based on the search criteria; and a system for providing a set of matching encapsulation assets based on a search.

A fourth aspect of the invention provides a method for managing video data, the method comprising: managing a set of encapsulation assets, wherein each encapsulation asset includes data for a unique instance of a tracking object in video, wherein the managing step includes: obtaining a set of tracking object metadata; obtaining a set of background images from the video; obtaining a set of object images for the tracking object; and obtaining a set of reconstruction data for approximating the video using the set of background images and the set of object images; receiving search criteria for the tracking object metadata; searching the set of encapsulation assets based on the search criteria; and providing a set of matching encapsulation assets based on a search.

A fifth aspect of the invention provides a computer program product stored on a computer-readable medium, the computer program product including computer program code to enable a computer infrastructure to manage video data by performing the method steps of the invention.

A sixth aspect of the invention provides a business method for managing video data, the business method comprising managing a computer infrastructure that performs each of the steps of the invention; and receiving payment based on the managing step.

A seventh aspect of the invention provides a method of generating/deploying a system for managing video data, the method comprising: obtaining a computer infrastructure; and deploying means for performing each of the steps of the invention to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 6 shows a more detailed view of the enterprise information server of FIG. 1 according to an embodiment of the invention.

FIG. 7 shows an illustrative interface according to an embodiment of the invention.

FIG. 11 shows illustrative steps for performing a federated search according to an embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides an improved solution for managing video data. In particular, for each instance of a tracking object in video, an encapsulation asset is generated. The encapsulation asset includes a set of tracking object metadata, a set of background images from the video, a set of object images for the tracking object, and a set of reconstruction data that can be used to approximate the video using the sets of background images and object images. The encapsulation assets and/or video can be stored in a computer architecture, such as an enterprise information system, and searches can be performed on the encapsulation assets.

Figure 1:
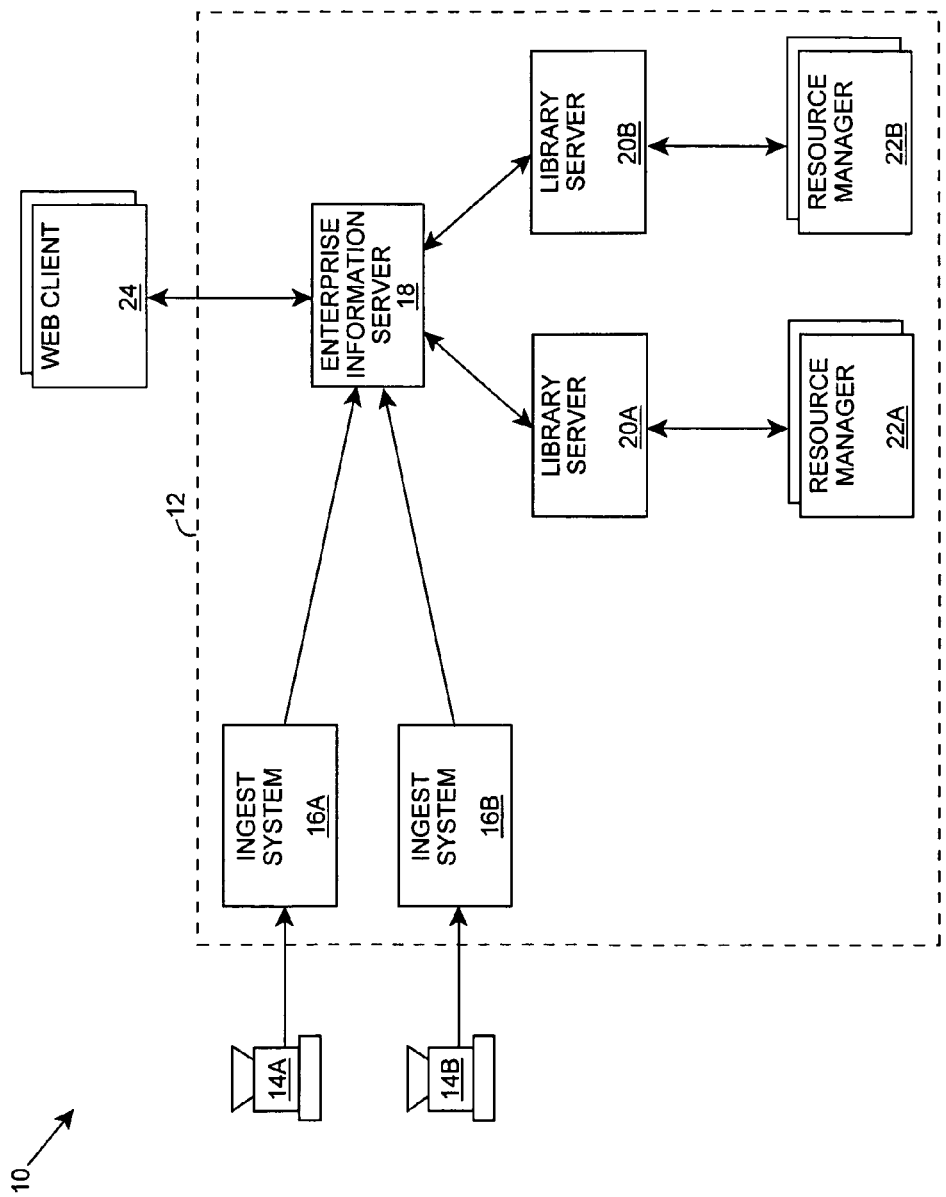
FIG. 1 shows an illustrative environment for managing video data according to an embodiment of the invention.

Turning to the drawings, FIG. 1 shows an illustrative environment 10 for managing video data according to one embodiment of the invention. In general, a set (one or more) of cameras 14A-B acquire video. As used herein, the term "video" refers generically to a series of images obtained by a single camera 14A-B. To this extent, video can comprise a series of images rapidly obtained by a video camera 14A-B, a series of discrete images periodically (e.g., once every second) obtained by a still camera 14A-B, or the like. In one embodiment, cameras 14A-B comprise surveillance cameras 14A-B that acquire video for a fixed area (e.g., a store, a parking lot, a mass transportation station, an intersection, etc.). Regardless, it is understood that cameras 14A-B can acquire video of any type, e.g., color/grayscale, digital/analog, infrared/visible light-based, etc. Further, in addition to image data, video can include audio data.

Environment 10 includes a computer infrastructure 12 that can perform the various process steps described herein for managing video data. To this extent, a set of ingest systems 16A-B each receive video from one or more cameras 14A-B. In general, each ingest system 16A-B generates an encapsulation asset for a tracking object based on the video. Subsequently, ingest system 16A-B provides the encapsulation asset and/or video to an enterprise information server 18. Enterprise information server 18 manages all of the encapsulation assets and/or video obtained from ingest systems 16A-B.

In one embodiment, enterprise information server 18 exploits one or more library servers 20A-B to implement the indexing, describing, locating, organizing, etc., of encapsulation assets and/or video. For example, each library server 20A-B can comprise a Content Manager Library Server offered by International Business Machines Corp. of Armonk, N.Y. (IBM). In this case, each library server 20A-B can use a DB2 database to catalog various encapsulation assets and/or video. Further, each library server 20A-B can use one or more resource managers 22A-B. Each resource manager 22A-B can comprise a specialized repository that is optimized to manage the storage, retrieval and archival of some or all of encapsulation assets and/or video. In one embodiment, one or more resource managers 22A-B use a storage manager (not shown), such as IBM's Tivoli Storage Manager, for the necessary archival and storage functionality.

As shown, computer infrastructure 12 provides a highly scalable architecture for managing video data. For example, as the amount of video data (e.g., raw video, encapsulation assets) increases, the number of library servers 20A-B and/or resource managers 22A-B can be increased accordingly without compromising the performance of computer infrastructure 12. Further, enterprise information server 18 can enable disparate clients, such as one or more web clients 24, to concurrently perform information mining and/or "intelligent" searches across all of the library servers 20A-B. Further, enterprise information server 18 can enable numerous types of applications, such as vertical industry application(s), web application(s), etc., to access the video data in computer infrastructure 12. For example, enterprise information server 18 can publish an open set of application program interface (API) functions, which various applications can use to access the video data.

In one embodiment, each ingest system 16A-B, enterprise information server 18, library server 20A-B, and resource manager 22A-B comprises a unique computing device and/or a group of computing devices, such as a server cluster. In this case, communications between the computing devices can occur over any combination of various types of wired and/or wireless communications links, such as a network, a shared memory, or the like, to perform the various process steps of the invention. When a communications link comprises a network, the network can comprise any combination of one or more types of networks (e.g., the Internet, a wide area network, a local area network, a virtual private network, etc.). Regardless, communications between the computing devices may utilize any combination of various types of transmission techniques. Further, in other embodiments, the functionality provided by two or more of the computing devices can be combined into a single computing device and/or one or more additional computing devices can be included in computer infrastructure 12.

As noted above, ingest systems 16A-B receive video (i.e., raw video) from one or more cameras 14A-B and generate an encapsulation asset for each unique instance of a tracking object in the video. A "tracking object" comprises any object of interest in video. For example, a tracking object could comprise an individual, an automobile, an animal, or the like. Further, a tracking object could comprise a group of objects, such as multiple individuals, an individual and an automobile, etc. Still further, a single tracking object could split into multiple tracking objects. For example, an individual could leave a briefcase behind, causing a single tracking object for the individual and the briefcase to change to two tracking objects, one for the individual and one for the briefcase.

Figure 2:
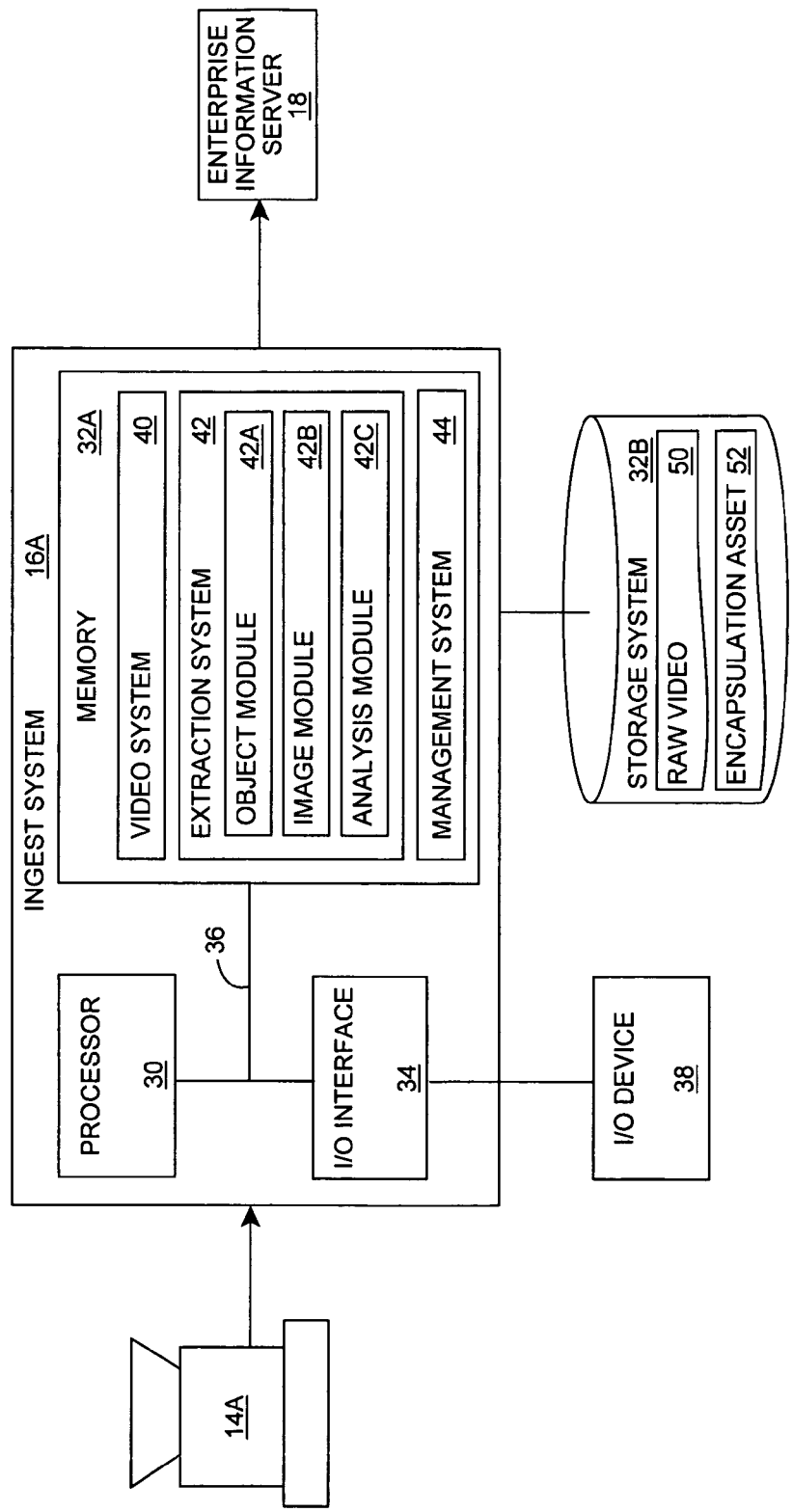
FIG. 2 shows a more detailed view of the ingest system of FIG. 1 according to an embodiment of the invention.

In any event, FIG. 2 shows a more detailed view of ingest system 16A according to an embodiment of the invention. As shown, ingest system 16A includes a video system 40, extraction system 42, and a management system 44, which enable ingest system 16A to receive raw video 50 from camera 14A and generate encapsulation asset(s) 52 by performing the process steps described herein.

Ingest system 16A is shown including a processor 30, a memory 32A, an input/output (I/O) interface 34, and a bus 36.

Further, ingest system 16A is shown in communication with an external I/O device/resource 38 and a storage system 32B. As is known in the art, in general, processor 30 executes computer program code, such as extraction system 42, that is stored in memory 32A and/or storage system 32B. While executing computer program code, processor 30 can read and/or write data, such as encapsulation asset 52, to/from memory 32A, storage system 32B, and/or I/O interface 34. Bus 36 provides a communications link between each of the components in ingest system 16A. I/O device 38 can comprise any device that enables a user to interact with ingest system 16A or any device that enables ingest system 16A to communicate with one or more other computing devices, such as enterprise information server 18.

In any event, ingest system 16A can comprise any general purpose computing article of manufacture capable of executing computer program code (e.g., a personal computer, server, handheld device, etc.). However, it is understood that ingest system 16A and computer program code, such as extraction system 42, are only representative of various possible equivalent computing devices that may perform the various process steps of the invention. To this extent, in other embodiments, ingest system 16A can comprise any combination of hardware and/or software for implementing the various process steps of the invention. In each case, the program code and/or hardware can be created using standard programming and engineering techniques, respectively.

In any event, video system 40 receives raw video 50 from one or more cameras 14A using any known solution. Video system 40 can store the raw video 50 in local storage, such as storage system 32B, for processing by extraction system 42. Extraction system 42 processes raw video 50 and extracts data for one or more encapsulation assets 52. To this extent, extraction system 42 is shown including an object module 42A for obtaining a tracking object in video 50, an image module 42B for extracting a set of background images and a set of object images based on the tracking object and video 50, and an analysis module 42C for generating a set of tracking object metadata and reconstruction data for approximating video 50 using the sets of background images and object images. Further, management system 44 can generate and/or obtain additional data that can be used in managing encapsulation asset 52 and/or the corresponding raw video 50. Once completed, management system 44 can provide encapsulation asset 52 with the corresponding raw video 50 to enterprise information server 18.

In any event, object module 42A can obtain a tracking object in video 50 using any known solution. For example, object module 42A can use image processing techniques, or the like, to automatically identify a tracking object (e.g., person, vehicle, etc.). To this extent, an object may be tracked only when it has certain characteristics (e.g., moving fast enough, person of interest, etc.). Alternatively, all objects that enter a field of view of a camera 14A can be tracked. Further, object module 42A could receive the tracking object from another system and/or from a user. In the latter case, a user could monitor the raw video from camera 14A and select particular objects that he/she desires to be tracked. Once a tracking object is obtained by object module 42A, an encapsulation asset 52 is generated by image module 42B, analysis module 42C, and/or management system 44.

When managing very large quantities of assets, e.g., in the millions or billions in the case of a video surveillance system, it is critical that an asset be readily located once the asset has been archived. In current video systems, such as video surveillance systems, a single camera 14A could generate approximately ten megabytes of data and/or approximately half a million rows in a database in about an hour. In this case, the use of hundreds of cameras 14A continuously tracking objects would generate a huge amount of data, making it very difficult to manage.

Figure 3:
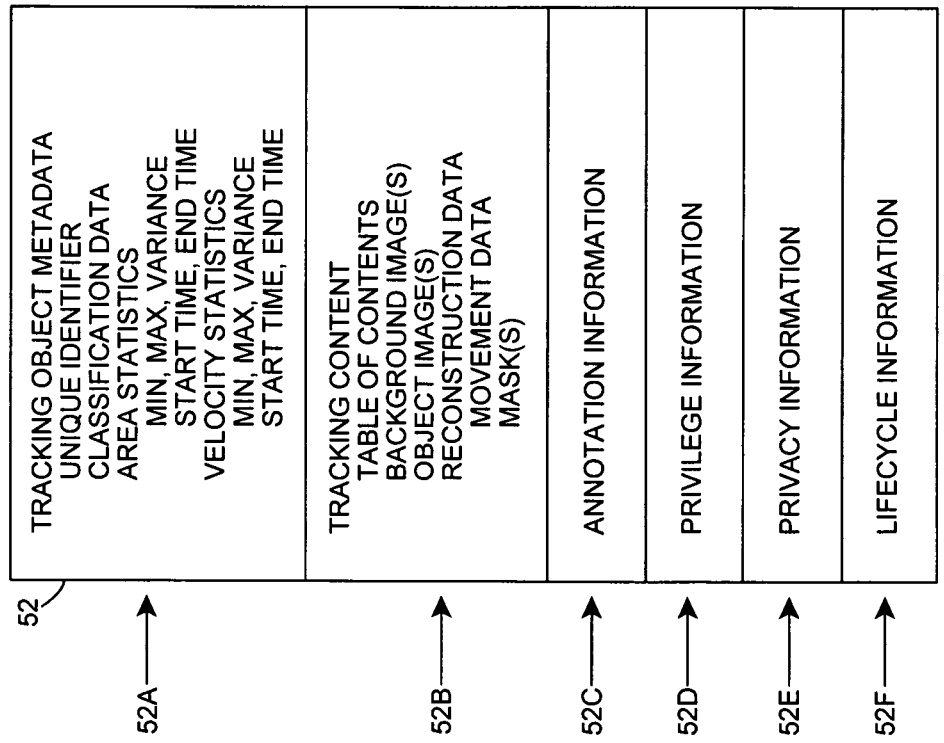
FIG. 3 shows an illustrative encapsulation asset according to an embodiment of the invention.

Encapsulation asset 52 stores all the video data, both parametric and resource, that is related to a particular tracking instance of a tracking object. Encapsulation asset 52 can store the video data in one or more compound structures, thereby reducing storage requirements and/or the number of searchable structures without losing information and providing more efficient query results. FIG. 3 shows an illustrative encapsulation asset 52 according to an embodiment of the invention. Referring to FIGS. 2 and 3, image module 42B can generate a set of tracking content 52B. Tracking content 52B can comprise a data container that stores the image content that image module 42B extracts from the raw video. To this extent, tracking content 52B is shown including a set of background images, a set of object images, and a set of reconstruction data. In operation, image module 42B identifies a tracking object and isolates it from the remainder of the image. The image of the tracking object is then stored as an object image and the remainder of the image is stored as a background image. Each time attributes of the background and/or tracking object change sufficiently from the stored image, image module 42B can extract and store another object/background image.

Further, image module 42B can generate reconstruction data that can enable the raw video to be approximated using the sets of background images and object images. For example, image module 42B can generate a set of movement data that includes detailed information regarding the movement of the tracking object within the field of view with respect to time. Further, image module 42B can generate a set of masks that include mask and unmask information for the object and background images. In one embodiment, tracking content 52B comprises a compound data structure in which the various content is stored in files. To this extent, tracking content 52B can further include a table of contents that lists the various files in tracking content 52B and assigns a unique number to each file.

Further, analysis module 42C can generate tracking object metadata 52A for encapsulation asset 52. Tracking object metadata 52A can include, for example: a unique identifier for the particular tracking instance represented by encapsulation asset 52; classification data, which can define a classification for the tracked object (e.g., a car, a person, etc.); a set of area statistics, such as a minimum, maximum, average, variance, etc., for the area that the tracked object consumes in the field of view (e.g., pixels); a set of velocity statistics, such as a minimum, maximum, average, variance, etc., for the movement of the tracked object within the field of view; etc. Further, the set of area statistics and/or the set of velocity statistics can each include start/end times for the particular range of values that are used to generate the statistics.

Encapsulation asset 52 can include additional information that is used to manage encapsulation asset 52 and/or the corresponding raw video 50. To this extent, management system 44 can generate and/or obtain camera 14A data, a time/date stamp, and the like, and store the information in encapsulation asset 52. Further, management system 44 can obtain annotation information 52C for the tracking object. Annotation information 52C can comprise information provided by a user, such as analysis information, comments, etc. In one embodiment, when no annotation information 52C is available, management system 44 can include an empty container so that annotation information 52C can be readily added at a later time.

Further, management system 44 can obtain privilege information 52D for the tracking object. In one embodiment, privilege information 52D comprises an access control list that comprises control rules that define the operations that are allowed to be performed on encapsulation asset 52 by particular users/user groups. Still further, management system 44 can obtain privacy information 52E. Privacy information 52E can define visual content in the object and/or background images that is subject to additional privileged access. For example, a user may be able to view certain images, but the identity of one or more individuals that appear in the images may need to be obscured. To this extent, privacy information 52E can comprise a start/stop time that requires protection and/or an area of the background/object image(s) that requires obscuring.

Management system 44 also can obtain lifecycle information 52F for encapsulation asset 52 and/or the corresponding raw video 50 (FIG. 2). Lifecycle information 52F can comprise "e-Record" information that enables computer infrastructure 12 (FIG. 1) to comply with record keeping mandates, regulatory guidelines, and/or the like. Lifecycle information 52F can limit the editable portions of encapsulation asset 52 (e.g., to annotation information 52C), define an amount of time for which encapsulation asset 52 and/or raw video 50 is to be archived, and/or the like.

Figure 4:
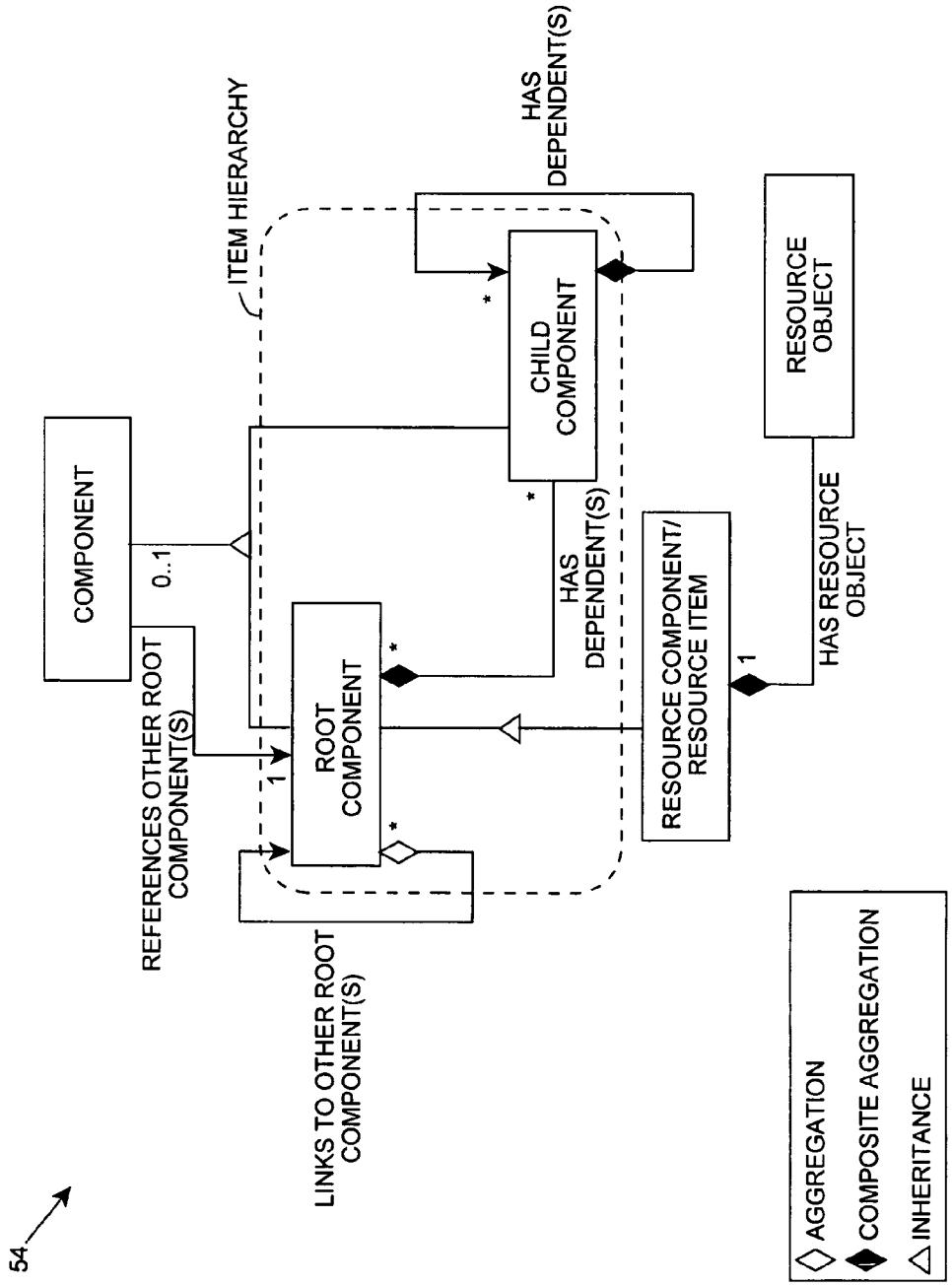
FIG. 4 shows an illustrative data model that can be used to store the encapsulation asset of FIG. 3 according to an embodiment of the invention.

Encapsulation asset 52 supports multi-level, hierarchical structures that allow for the definition of a complex tracking object metadata 52A hierarchy and one-to-many relationships between tracking content 52B and its attributes, including multi-valued attributes. To this extent, FIG. 4 shows an illustrative data model 54 that can be used to store encapsulation asset 52 (FIG. 3) according to an embodiment of the invention. In data model 54 an "item" is defined as a generic term used to identify any instance of a particular item type, such as a document, a folder, a component, etc. Each item has attributes that are defined for the particular item type. To locate a particular item, the attributes can be searched. Attributes can be treated as a group and/or separately.

The item type is the main component of data model 54, and contains all child components, if any, and the associated data. Each item type includes a root component, which is the first or only level in the hierarchical item type, and zero or more child components, which is an optional second or lower level in the hierarchical item type. In one embodiment, there are two types of item type classifications, a non-resource item type and a resource item type. The non-resource item type represents entities not stored in a resource manager 22A-B (FIG. 1). For example, these entities could be stored as metadata on a library server 20A-B (FIG. 1). Conversely, the resource item type represents entities stored in a resource manager 22A-B. These entities, such as tracking content 52B (FIG. 3), include items that describe and point to content on the resource manager 22A-B, such as video, images, files, and/or other data.

In one embodiment, dynamic data objects (DDOs) represent components (root components, child components and resource components) in data model 54. To this extent, a persistent data identifier can uniquely identify these objects, which have data items for its attribute values and content. Each data item has a data identifier, a name, a value and properties (like null-able, data type, etc.). Item type classification is a design-time description of a component, which may support specialized functionality, attributes, and behavior of items created of the item type.

Figure 5:
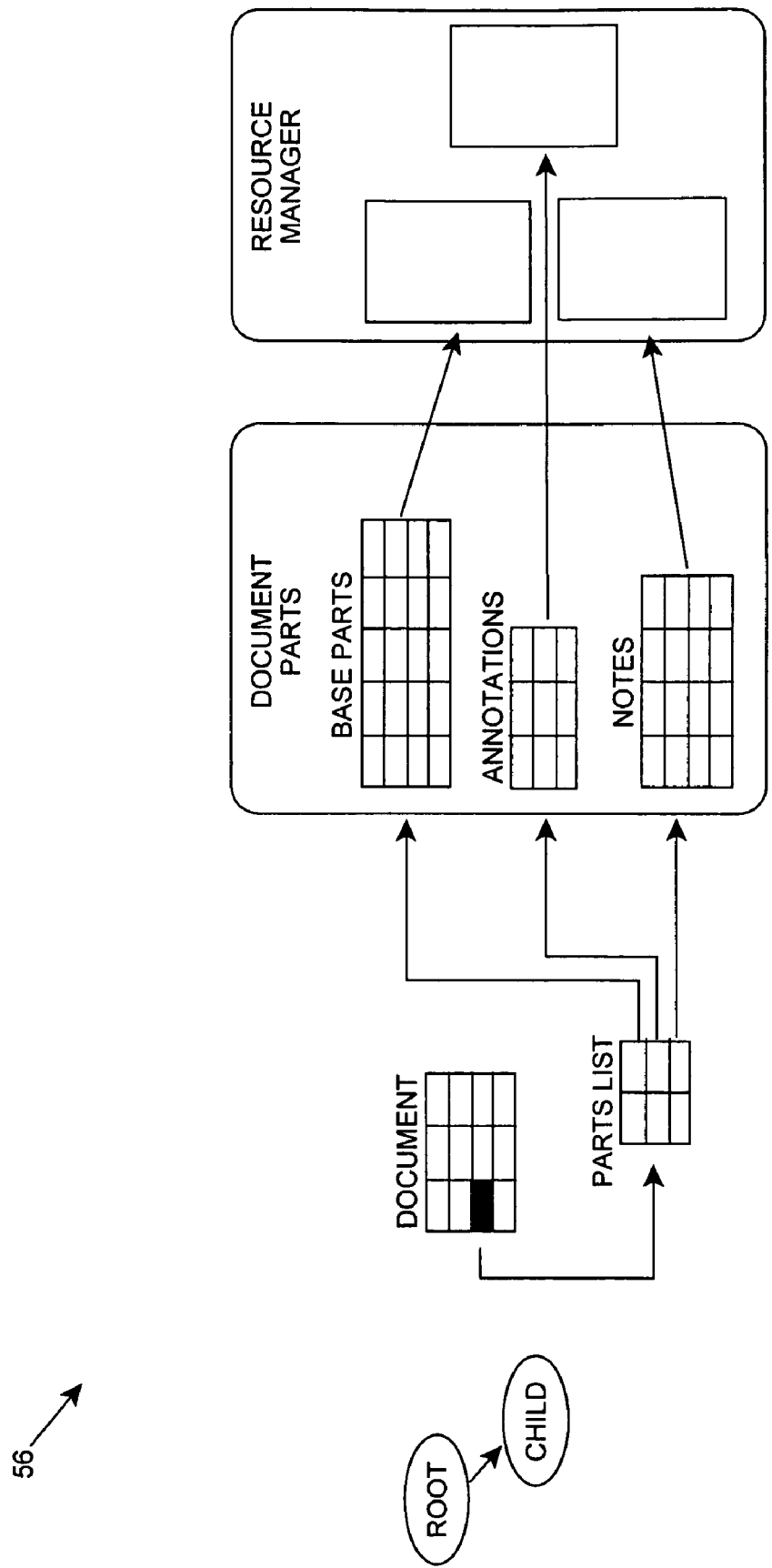
FIG. 5 shows an illustrative flow diagram for a flat data model.

Additionally, computer architecture 12 (FIG. 1) can utilize a flat data model. For example, FIG. 5 shows an illustrative flow diagram 56 for a flat data model. In particular, the flat data model can include several predefined document parts, namely: "base", which contains any type of content, including image and audio; "basetext", which contains text that can be indexed for searching; "notelog", which contains a text log of information entered by one or more users; "annotation", which contains additions to and/or commentary about the data; and "stream", which contains streamed data, such as video.

Returning to FIG. 1, each camera 14A-B can be modeled to a particular item type, which enables any dependency between camera 14A-B and its corresponding data containers to be isolated. When each camera 14A-B has an associated item type, the content can be distributed to multiple library servers 20A-B. Since each library server 20A-B stores parametric information (e.g., non-resource item types) for one or more cameras 14A-B, as more cameras 14A-B provide video to computer infrastructure 12, the amount of library servers 20A-B can be increased. However, since resource managers 22A-B store the actual content, then as the amount of video data generated by cameras 14A-B increases, the number of resource managers 22A-B should be increased. In particular, a resource manager 22A-B can be added for a library server 20A-B that is serving a set of cameras 14A-B that generate a high amount of video data.

Computer infrastructure 12 enables users/applications to edit, view, modify, delete, query, etc., the video data. To this extent, web client 24 can submit/request video data and receive video data from enterprise information server 18. FIG. 6 shows a more detailed view of enterprise information server 18 according to an embodiment of the invention. In particular, enterprise information server 18 is shown including a content system 46, an interface system 38, and a search system 49. Content system 46 receives video data from the various ingest systems 16A and can forward the video data to a corresponding library server 20A and/or resource manager 22A for archiving, storage, etc.

Interface system 48 can enable one or more applications, e.g., web clients 24, to edit, view, query, etc., the video data stored in computer infrastructure 12 (FIG. 1). Interface system 48 can receive query requests and the like from web client 24 using any known solution. For example, web client 24 can use one or more API function calls to request a query. Further, interface system 48 can generate a set of interfaces that enable a user to generate and request a query. To this extent, FIG. 7 shows an illustrative interface 60 that can be generated by interface system 48. As shown, interface 60 enables various video data, such as tracking object metadata 52A (FIG. 3), to be specified and searched. For example, using interface 60, a user can query the video data for a particular type of tracking object, a movement change for a tracking object (e.g., sudden change in velocity, sudden stop, quick acceleration, etc.), a velocity of a tracking object (e.g., all tracking objects (cars) moving faster than thirty miles per hour), etc.

Returning to FIG. 6, interface system 48 can format and forward the requested query on to search system 49, which manages the search of the video data. Interface system 48 and search system 49 also can enable web client 24 to perform more complex, higher level searches. To this extent, search system 49 can comprise functionality that analyzes the information extracted from the video and stored in encapsulation assets 52 (FIG. 2). For example, search system 49 can perform motion pattern distribution, motion pattern analysis (e.g., find common elements between multiple tracking instances), etc. Using this functionality, web client 24 can perform more complex queries on directional motion, license plate information, etc. Further, web client 24 can perform more general queries such as "are there any abandoned objects in the airport?", "how many people are present in the parking lot?", "Where is the individual going?", "Where did the individual come from?", etc. Still further, search system 49 can identify anomalous behavior, such as a speeding vehicle.

In one embodiment, search system 49 supports an XML-based query language based on XPath, which efficiently traverses the hierarchical data model described herein to locate items quickly and easily. Search system 49 can enable all aspects of encapsulation asset 52 (FIG. 2) to be queried. To this extent, search system 49 can support four types of query objects: parametric, text, combined, and image.

A parametric search requires an exact match between the condition specified in the query predicate and the data values stored on the library server 20A, such as item/component properties, attributes, etc. A text search can search one or more text indexes of the same type on library server 20A and/or resource manager 22A to search text data included in encapsulation asset 52. In one embodiment, library server 20A and/or resource manager 22A includes a text search engine, such as DB2 Text Information Extender (TIE) for DB2 or DB2 Net Search Extender (NSE) for DB2 both offered by IBM, which generates text indexes for text stored in documents. Library server 20A and/or resource manager 22A can perform a text search on nearly any data of an item/component, text within an item/component, and/or text within resource content. A combined search comprises both a parametric search and a text search.

Library server 20A and/or resource manager 22A can perform a full text search on text-type metadata attributes and/or text content. An attribute of any length can be used, such as an abstract of a document. When an item type is defined as a full text index class, library server 20A and/or resource manager 22A can automatically full text index text data loaded into this class. Similarly, library server 20A and/or resource manager 22A can automatically build a full text index when data is stored via the open document management API interface. A search model can query all aspects of the data model, hide the complexities within underlying system tables, efficiently execute queries, etc., using cached data model definitions and an integrated text search based on the DB2 Text Information Extender (TIE) offered by IBM.

All queries can be performed on component type views. Therefore, a name that is used for a root component and/or a child component in a query string can be the name of either a base component type view created by library server 20A and/or resource manager 22A or the name of a user-defined component type view. In either case, when a query is submitted for data, such as a document, object, and so forth, the request can be directed to a query engine on one or more library servers 20A and/or resource managers 22A, which processes the query and translates it to the appropriate SQL.

In any event, search system 49 can generate a search string and provide the search string to each library server 20A in computer infrastructure 12 (FIG. 1). Further, each library server 20A can propagate the search string to each corresponding resource manager 22A. In this manner, the search can be performed in parallel against all video data in computer infrastructure 12. The search string defines the item type(s) and the search criteria to be used. A result of a particular search performed on a library server 20A and/or resource manager 22A can comprise an ordered or unordered set of dynamic data objects, each of which refers to a particular item/component. Each library server 20A and/or resource manager 22A can return any matching dynamic data objects to search system 49 using any solution, e.g., as obtained, in a block (e.g., twenty at a time), etc. Search system 49 can group the results by the corresponding library server 20A and/or resource manager 22A.

Enterprise information server 18 can employ a "federated search" strategy to implement the search. In this case, interface system 48 can generate a federated query form to receive a set of search criteria for the federated search. The federated query form can obtain the search criteria in a structure that is used by a client application, e.g., web client 24. Interface system 48 can use a client schema mapping that maps a schema used by search system 49 to the structure used by the client application. The client schema mapping handles the difference between how the video data is physically stored and how the client application wants the video data.

Further, search system 49 can use a federated schema that maps concepts used in search system 49 to concepts used in each library server 20A and/or resource manager 22A. After mapping the concepts, search system 49 can provide the searches to each library server 20A and/or resource manager 22A to perform the search. After receiving the results, search system 49 can map the results to the concepts used by search system 49 using the federated schema. Subsequently, interface system 48 can provide the results to web client 24 as a federated collection in which each member is a dynamic data object. Further, interface system 48 can use an iterator to access each member in the collection. In this case, a call to move the iterator can return a corresponding dynamic data object from the collection.

Figure 8:
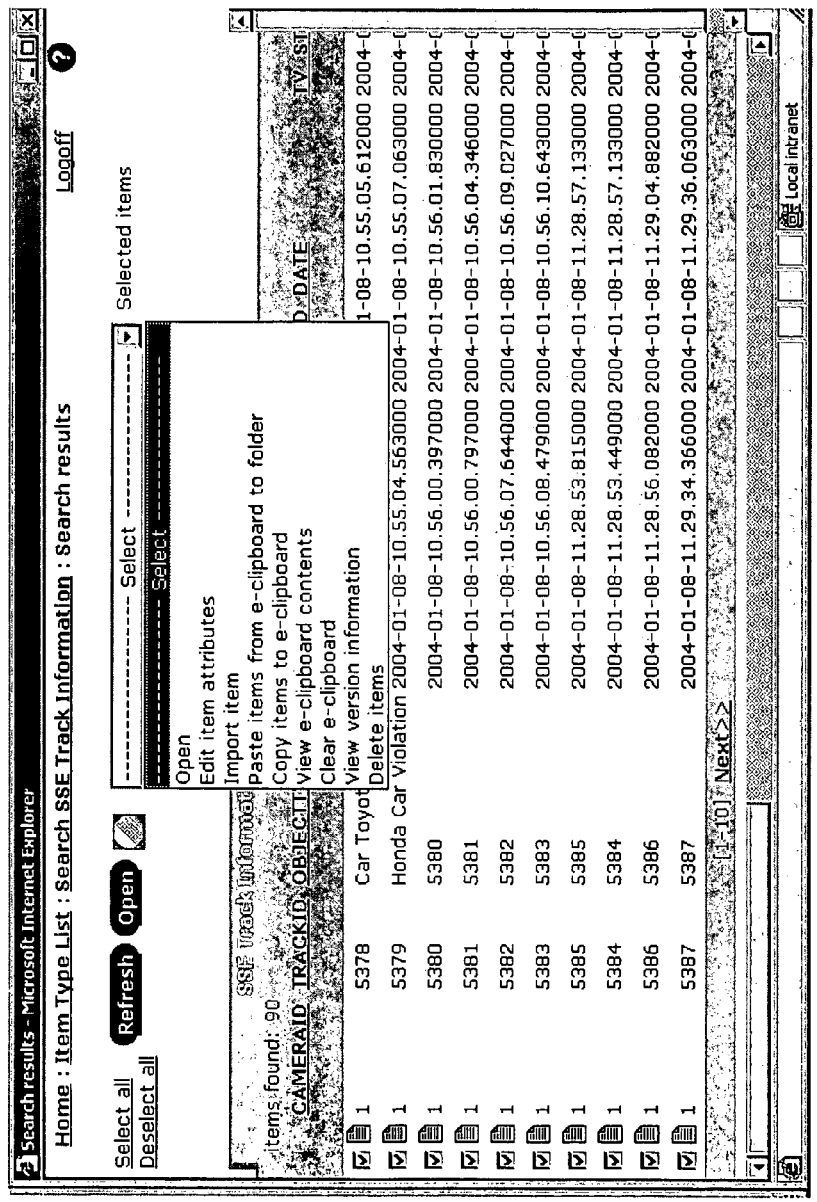
FIG. 8 shows an illustrative query result page according to an embodiment of the invention.

Additionally, interface system 48 can generate a web page that includes the results. For example, FIG. 8 shows an illustrative query result page 62 that can be generated by interface system 48 and provided for display at web client 24. When a user selects to view the video that corresponds to one of the entries in the query results, interface system 48 can generate an approximation of the original video using tracking content 52B (FIG. 3) in the corresponding encapsulation asset 52 (FIG. 3). In this manner, an accurate approximation of the original video can be rendered without having to store and/or access the actual video that was recorded.

After receiving the results, interface system 48 can access privilege information 52D (FIG. 3) and filter any entries for which web client 24 does not have privilege. Alternatively, the privilege level of web client 24 could be included in the query so that only those results to which web client 24 has access are returned. Further, in generating the approximation of the original video, interface system 48 can further access privilege information 52D (FIG. 3) and/or privacy information 52E (FIG. 3) to determine whether a portion of the original video should be blurred, removed, etc. Still further, based on the privileges of web client 24, interface system 48 can provide the original video to web client 24, when it is separately archived in computer infrastructure 12 (FIG. 1).

Content system 46 can automatically perform various maintenance-related functions for the video data. For example, content system 46 can periodically (e.g., once a day) purge old video data based its corresponding lifecycle information 52F (FIG. 3). Further, search system 49 can automatically perform one or more searches (e.g., identify objects left behind, illegal/suspicious behavior, etc.) on the video data, and forward data on any events of interest to interface system 48 for rendering to a web client 24. In this manner, enterprise information server 18 can provide a largely autonomic surveillance solution.

Figure 9:
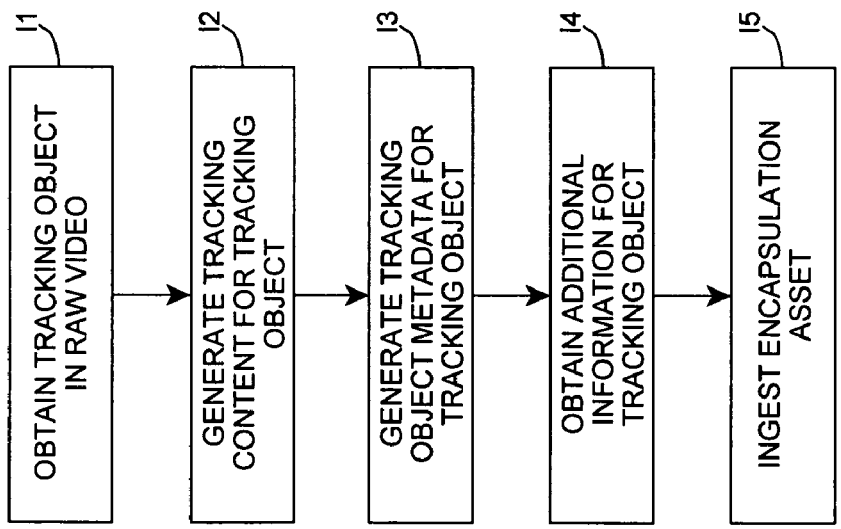
FIG. 9 shows illustrative method steps for ingesting video data according to an embodiment of the invention.

As discussed herein, the invention provides various methods for ingesting, searching, retrieving and/or displaying video data. To this extent, FIG. 9 shows illustrative method steps for ingesting video data according to an embodiment of the invention. Referring to FIGS. 1-3 and 9, in step I1, object module 42A obtains a tracking object in raw video 50 received from camera 14A. In step I2, image module 42B generates tracking content 52B for the tracking object based on video 50. In step I3, analysis module 42C generates tracking object metadata 52A based on the tracking content 52B. In step I4, management system 44 obtains various other information 52C-F and adds it to encapsulation asset 52. In step I5, the encapsulation asset 52 is ingested. In particular, management system 44 provides encapsulation asset 52 to enterprise information server 18, which in turn forwards it to a library server 20A-B. Library server 20A-B indexes the tracking content metadata 52A, and forwards tracking content 52B and/or raw video 50 on to a resource manager 22A-B for archiving and storage.

Figure 10:
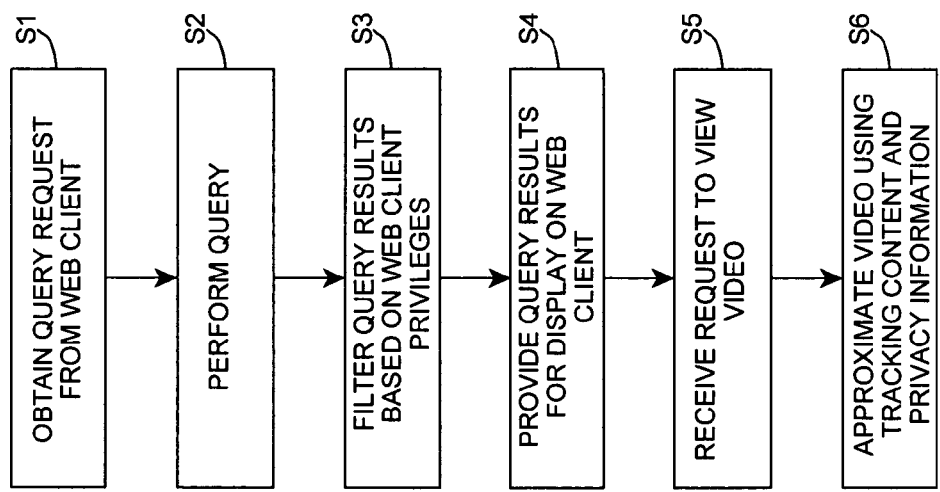
FIG. 10 shows illustrative steps for implementing a query according to an embodiment of the invention.

FIG. 10 shows illustrative steps for implementing a query according to an embodiment of the invention. Referring to FIGS. 6 and 10, in step S1, interface system 48 can obtain a query request from a web client 24. In step S2, search system 49 can perform the query using library servers 20A and/or resource managers 22A. In step S3, interface system 48 filters the query results based on the privilege rights of web client 24. In step S4, interface system 48 provides the query results for display on web client 24. In step S5, interface system 48 receives a request to view the video of at least one result. In step S6, interface system 48 approximates the video using tracking content 52B (FIG. 3) and/or privacy information 52E (FIG. 3) for each result. In particular, interface system 48 can obtain the sets of background images and object images and approximate the video using the reconstruction data. Prior to providing the video for display at web client 24, interface system 48 can check privacy information 52E to determine if any of the content should be obscured and/or withheld.

As discussed herein, search system 49 can perform a federated search. To this extent, FIG. 11 shows illustrative steps for performing the federated search according to an embodiment of the invention. Referring to FIGS. 6 and 11, in step F1, interface system 48 and/or search system 49 can translate the query for each library server 20A and/or resource manager 22A. In step F2, search system 49 can add any necessary filtering to the query (e.g., based on privilege information). In step F3, search system 49 submits the query to each library server 20A, which may in turn submit the query to one or more resource managers 22A. In step F4, search system 49 receives the query results from the various library servers 20A. In step F5, search system 49 and/or interface system 48 translates the results for web client 24. In step F6, interface system 48 can merge the results into a collection.

While shown and described herein as a method and system for managing video data, it is understood that the invention further provides various alternative embodiments. For example, in one embodiment, the invention provides a computer-readable medium that includes computer program code to enable a computer infrastructure to manage video data. To this extent, the computer-readable medium includes program code, such as extraction system 42 (FIG. 2) and/or search system 49 (FIG. 6), that implements some or all of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 32A (FIG. 1) and/or storage system 32B (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as a security company, could offer to manage video data as described above. In this case, the service provider can manage (e.g., create, maintain, support, etc.) a computer infrastructure, such as computer infrastructure 12 (FIG. 1), that performs the process steps described herein for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for managing video data. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as enterprise information server 18 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing video data, the method comprising:
   obtaining a tracking object in the video;
   generating an encapsulation asset for the tracking object based on the video, wherein the generating step includes:
      obtaining a set of tracking object metadata, the set of tracking object metadata including a classification, a set of area statistics, and movement information for the tracking object;
      extracting a set of background images from the video;
      extracting a set of object images for the tracking object, each object image being a portion of an image included in the video;

generating a set of reconstruction data for approximating the video using the set of background images and the set of object images; and storing the set of tracking object metadata, the set of background images, the set of object images, and the set of reconstruction data within the encapsulation asset; and managing access to the data stored within the encapsulation asset using the encapsulation asset.

2. The method of claim 1, wherein the obtaining a set of tracking object metadata step includes:
obtaining classification data for the tracking object;
obtaining a set of area statistics for the tracking object from the video; and
obtaining a set of velocity statistics for the tracking object from the video.

3. The method of claim 1, wherein the generating a set of reconstruction data step includes:
generating a set of movement data for the tracking object; and
generating a set of masks based on the set of object images and the set of background images.

4. The method of claim 1, wherein the generating an encapsulation asset step further includes obtaining annotation information for the tracking object and storing the annotation information within the encapsulation asset.

5. The method of claim 1, wherein the generating an encapsulation asset step further includes obtaining a set of privilege information for the tracking object and storing the set of privilege information within the encapsulation asset.

6. The method of claim 1, wherein the generating an encapsulation asset step further includes obtaining privacy data for the tracking object and storing the privacy data within the encapsulation asset.

7. The method of claim 1, wherein the generating an encapsulation asset step further includes obtaining lifecycle information for the tracking object and storing the lifecycle information within the encapsulation asset.

8. The method of claim 1, further comprising separately storing the video from the encapsulation asset.

9. The method of claim 1, wherein the managing includes:
receiving search criteria for the tracking object metadata;
searching a set of encapsulation assets based on the search criteria; and
providing a set of matching encapsulation assets based on the searching step.

10. A system for managing video data, the system comprising:
at least one computing device including:
a system for obtaining a tracking object in the video; and
a system for managing an encapsulation asset for the tracking object based on the video, wherein the encapsulation asset includes:
a set of tracking object metadata, the set of tracking object metadata including a classification, a set of area statistics, and movement information for the tracking object;
a set of background images from the video;
a set of object images for the tracking object, each object image being a portion of an image included in the video; and
a set of reconstruction data for approximating the video using the set of background images and the set of object images,
wherein the system for managing manages access to the data stored within the encapsulation asset using the encapsulation asset.

11. The system of claim 10, the at least one computing device further including a system for separately storing the video from the encapsulation asset.

12. The system of claim 10, the at least one computing device further including:
a system for receiving search criteria for the tracking object metadata;
a system for searching a set of encapsulation assets based on the search criteria; and
a system for providing a set of matching encapsulation assets based on a search.

13. The system of claim 10, the at least one computing device further including a system for receiving the video.

14. The system of claim 10, the at least one computing device further including at least one camera for capturing the video.

15. A system for managing video data, the system comprising:
at least one computing device including:
a system for managing a set of encapsulation assets, wherein each encapsulation asset includes data for a unique instance of a tracking object in video, wherein the encapsulation asset includes:
a set of tracking object metadata, the set of tracking object metadata including a classification, a set of area statistics, and movement information for the tracking object;
a set of background images from the video;
a set of object images for the tracking object, each object image being a portion of an image included in the video; and
a set of reconstruction data for approximating the video using the set of background images and the set of object images;
a system for receiving search criteria for the tracking object metadata;
a system for searching the set of encapsulation assets based on the search criteria; and
a system for providing a set of matching encapsulation assets based on a search.

16. The system of claim 15, the at least one computing device further including:
a system for receiving a request for the video corresponding to one of the set of encapsulation assets; and
a system for retrieving the video based on the one of the set of encapsulation assets.

17. The system of claim 15, wherein the system for managing includes:
a system for identifying a tracking object in the video; and
a system for generating an encapsulation asset based on the tracking object and the video.

18. The system of claim 15, the at least one computing device further including a system for receiving the video from a camera.

* * * * *